United States Patent [19]
Johnson et al.

[11] 3,972,058
[45] July 27, 1976

[54] FOLLOW FOCUS INTERCEPT ACTUATING SYSTEM FOR PHOTOGRAPHIC APPARATUS

[75] Inventors: Bruce K. Johnson, Andover; George D. Whiteside, Lexington, both of Mass.

[73] Assignee: Polaroid Corporation, Cambridge, Mass.

[22] Filed: Mar. 3, 1975

[21] Appl. No.: 554,925

[52] U.S. Cl. ................................ 354/149; 354/30; 354/196
[51] Int. Cl.² ........................................ G03B 7/00
[58] Field of Search .......... 354/149, 139, 196, 270, 354/271, 272, 32, 42, 29, 30

[56] References Cited
UNITED STATES PATENTS
3,714,871  2/1973  Bresson............................. 354/32 X
3,832,722  8/1974  Douglas......................... 354/196 X

FOREIGN PATENTS OR APPLICATIONS
1,037,503  1966  United Kingdom................. 354/139

*Primary Examiner*—L. T. Hix
*Assistant Examiner*—E. M. O'Connor
*Attorney, Agent, or Firm*—Edward S. Roman

[57]  ABSTRACT

An exposure control system with follow focus capability is provided for a photographic camera apparatus of the non-single lens reflex viewing type having means for receiving and initiating the energization of a source of artificial light to illuminate a photographic scene. The follow focus aspect of the exposure control system is automatically actuable to provide a range responsive aperture adjustment upon the mounting of a flash unit upon the camera apparatus.

27 Claims, 9 Drawing Figures

FOLLOW FOCUS INTERCEPT ACTUATING SYSTEM FOR PHOTOGRAPHIC APPARATUS

BACKGROUND OF THE INVENTION

1. Field of the Invention

This invention relates generally to an exposure control system for a photographic apparatus and more particularly to an improved exposure control system having a follow focus capability for a photographic apparatus of the type having means for initiating the energization of a source of artifical light to illuminate a photographic screen. The follow focus capability is made possible by an interceptor assembly which is automatically actuable in a simple and reliable manner upon receipt of a source of artificial light by the photographic apparatus.

2. Description of the Prior Art

The exposure system of a photographic camera when operated in conjunction with a flash or transient illumination is ordinarily adjusted as a function of the levels of illumination anticipated at the scene being photographed. An evaluation based on the anticipated level of illumination may be made based upon an application of the inverse square law of light energy propagation which may be additionally weighted to anticipate spurious room reflections. Under this law, the light energy available from a given source is considered to vary inversely with the square of the distance from that source. Accordingly to make an appropriate exposure mechanism adjustment for flash photography, source to subject distance is derived and the value of this distance is utilized to compute an appropriate exposure value or illuminational factor.

In some camera designs, exposure control adjustment for flash operation is effected automatically by incorporating within the camera apparatus what is termed as a follow focus system. With a follow focus arrangement, aperture adjustment or flash illumination output control is mechanically coupled with the range finding or focusing system of a camera. In effect, a follow focus control represents a second exposure control system for a camera. As such, its presence necessarily contributes to the size and complexity of a camera.

A follow focus control system for an exposure control system is described in a U.S. Patent entitled "Focus Responsive Exposure Control System" by V. K. Eloranta and E. K. Shenk, Ser. No. 3,750,543 filed Apr. 19, 1971 and assigned in common herewith. The patent describes a second flash mode control system wherein an electromagnetic device, such as a solenoid, is selectively maneuvered and energized to extend its plunger to arrest the position of exposure aperture blades in accordance with focal setting. A complete follow focus system is described in a U.S. Patent entitled "Apparatus and System for Flash Photography" by Lawrence M. Douglas filed Mar. 15, 1973 No. 3,832,722 and assigned in common herewith. This system achieves a requisite compactness to meet the overall camera design described in U.S. Pat. No. 3,714,879 and incorporates means for selective use of the follow focus system exclusively during the flash illuminated exposure mode of operation. The above follow focus system additionally provides a trim function to accomodate for slight variations in the sensitometric characteristic of the film as well as to insert a modicum of personal or overriding control over the automated system. The trim control has only one control element for operation in this manner substantially reducing the possibility that a camera operator may become confused or overlook a requirement for providing a trim control for that mode of operation for which he is currently using.

A follow focus system of the above described type is designed for operation in conjunction with a single lens reflex receiving system together with a motorized automatic film processing arrangement as described in U.S. Pat. No. 3,714,879, Supra. Exposure regulation within this thin, compact camera takes place as part of a complex multi-step program involving the conversion of an optical path between viewing and exposure operational modes. The follow focus system must therefore be selectively actuated within this complex program logic of the reflex camera when a flash unit is mounted thereon.

Photographic camera apparatus of the non single lens reflex type have also been provided with range responsive aperture adjustment (follow focus) as described in a U.S. Pat. No. 3,714,871 entitled "Camera Apparatus Adapted For Operation With Auxiliary Light Source" by R. J. Bresson, filed Sept. 13, 1971. Such follow focus systems automatically actuate to provide range responsive aperture adjustment upon the mounting of a flash unit and thus are not selectively actuated as part of a complex multi-step program involving the conversion between viewing and exposure modes.

It is therefore a primary object of this invention to provide an exposure control system with follow focus capability for a photographic camera apparatus wherein the follow focus system is automatically actuable in a single and reliable manner to provide a range responsive aperture adjustment upon the mounting of a flash unit upon the camera apparatus.

It is also an object of this invention to provide an exposure control system with automatically actuable follow focus capability for a photographic camera apparatus of the non single lens reflex viewing type.

It is an additional object of this invention to provide an exposure control system with follow focus capability for a photographic camera apparatus wherein a unitary biasing spring is strategically located to simultaneously perform a plurality of functions in order to simplify the mechanism for actuating the follow focus system upon the mounting of a flash unit upon the camera apparatus.

It is a further object of this invention to provide an exposure control system with follow focus capability for a photographic camera apparatus wherein the individual flash units need not be critically dimensioned in order to insure corresponding aperture adjustment between different flash units.

It is a still further object of this invention to provide an exposure control system with follow focus capability for a photographic camera apparatus including an actuating system responsive to the mounting of a flash unit on the camera for moving the follow focus system into its range responsive aperture defining position.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An exposure control mechanism is provided for a photographic apparatus of the type having means for initiating the energization of a source of artificial light to illuminate a photographic scene. The exposure control mechanism includes means defining an optical path together with an optical objective to image the scene at an image plane. Exposure means movable along a locus of travel to define a range of apertures over the optical path are also provided together with socket means for receiving the source of artificial light. Insertion of a source of artificial light within the socket means operates to move an actuating means in correspondence therewith. The actuating means in turn rotates a flapper means journalled for rotation with respect to a pivoted interceptor means so as to transversely rotate an interceptor edge portion of the flapper means into the exposure element locus of travel in order to arrest movement of the exposure means along the locus of travel. In this manner, a select aperture value is defined over the optical path when the source of artificial light is received by the socket means.

One feature of this invention relates to the interceptor edge, at least a portion of which defines an arc having a center axis coincident with the center axis about which the flapper means rotates. In this manner, the position at which the exposure means movement is arrested along the locus of travel becomes independent of the exact degree of rotation of the interceptor edge.

The point of engagement between the actuating means and flapper means is arranged to move thru a locus of travel lying on a plane of intersection with the pivot point of the interceptor means such that movement of the actuating means in response to insertion of a linear flash array operates only to rotate the flapper means without tending to rotate the interceptor means about its pivot point. Such rotation of the interceptor means would upset the precise position of interception as defined by the interceptor edge.

A unitary biasing means is also strategically located to simultaneously perform a plurality of functions such as biasing the flapper means to keep the interceptor edge out of the locus of travel of the exposure element during ambient operation. At the same time, the flapper means is also biased into continuous engagement with the actuating means so that a portion of the actuating means is maintained within the socket means for engagement with a source of artificial illumination. The unitary biasing means additionally biases the interceptor means for rotation about its pivot point in a manner facilitating movement of the interceptor means in correspondence with objective focusing.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment or when read in connection with the accompanying drawings or when like members have been employed in the different figures to note the same parts and wherein:

DESCRIPTION OF PREFERRED EMBODIMENT

Figure 1:
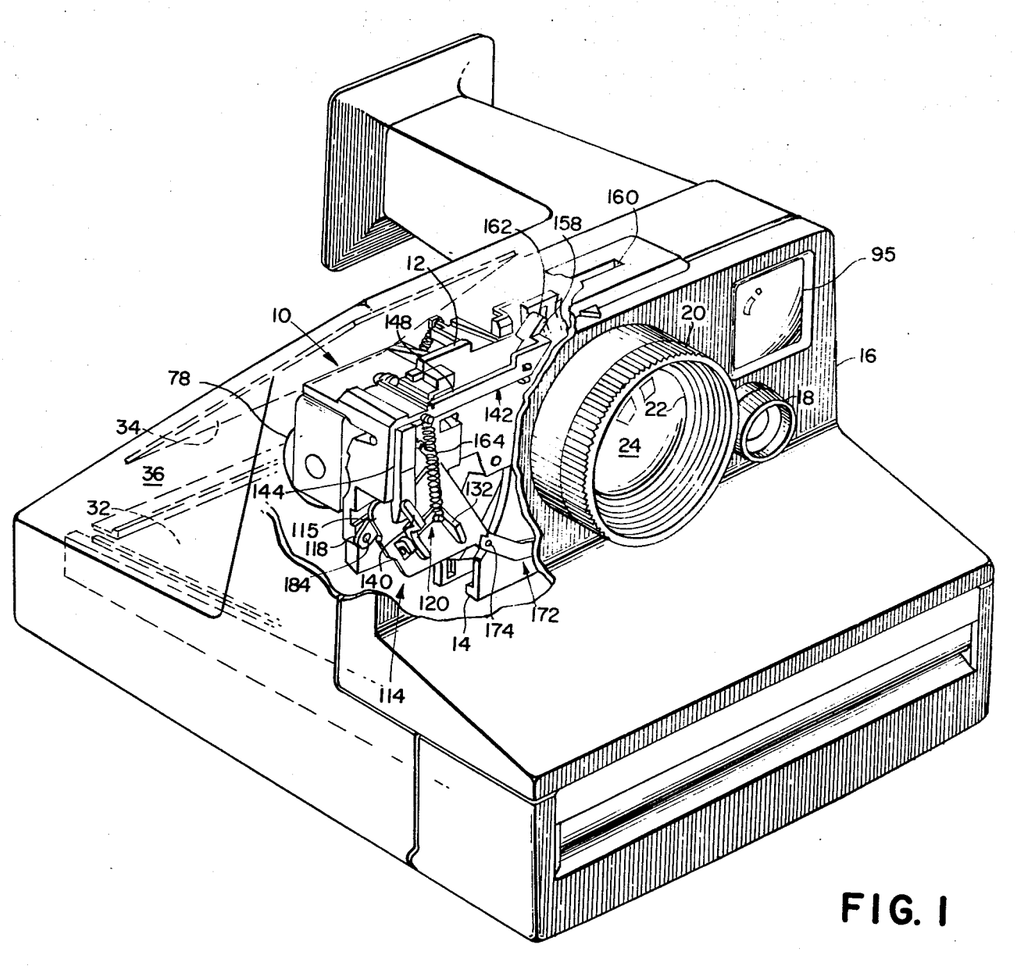
FIG. 1 is a perspective view of a photographic camera embodying the exposure control system of this invention.

Referring now to FIG. 1, it can be seen that the exposure control system of this invention is disposed within an exposure housing 10 comprising a baseblock casting 12 selectively machined to support the components of the exposure mechanism. Surrounding the front and top of the casting 12 there may be provided a cover 16 which includes openings through which protrude manually adjustable trim and focus bezels shown at 18 and 20 respectively. Intermediate the baseblock casting 12 and the front cover 16 there is provided a lens housing casting 14, the central portion of which includes a light entering exposure opening 22 which defines the maximum available exposure aperture for the system.

An objective or taking lens 24 is provided in overlying relation to the light entering opening 22 wherein the objective lens 24 may comprise a plurality of elements retained in predetermined spaced relation by a cylindrical lens mount assembly 28 which is externally threaded for toothed engagement with the internally threaded focus bezel 20. Bezel 20 is made rotatable with respect to the lens housing casting 14 and front cover 16 to provide translational movement of the elements of lens 24 along a central optical axis 30 of the optical path of the housing 10. As is readily apparent, the center optical axis 30 of the optical path is illustrated as being normal to the plane of the drawing. The rotation of focus bezel 20 may be carried out by manual rotation to provide displacement of the elements of objective lens 24 for focusing of image carrying rays through the light entering exposure opening 22 to a rearwardly positioned film plane 32 by way of a reflecting mirror 34 when the system is employed in conjunction with a suitable film exposure chamber 36. Immediately behind the objective lens 24 in light entering exposure opening 22 there are supported two overlapping shutter blade elements 38 and 40 which will be subsequently described in greater detail herein. Extending from the top of the housing 10 is a shutter release button (not shown), the depression of which causes the commencement of an exposure cycle.

A pair of scene light admitting primary apertures 42 and 44 are provided respectively in the blade elements 38 and 40 to collectively define a progressive variation of effective aperture openings in accordance with longitudinal and lateral displacement of one blade element with respect to the other blade element in a manner fully described in a U.S. Pat. application entitled "Camera With Pivoting Blades" by George D. Whiteside, filed July 2, 1974 now U.S. Pat. No. 3,942,183 and assigned in common herewith. The apertures 42 and 44 are selectively shaped so as to overlap the light entering exposure opening 22 thereby defining a gradually varying effective aperture size as a function of the position of blades 38 and 40. Each of the blades, 38 and 40, may additionally be configured to have corresponding photocell sweep secondary apertures shown respectively at 46 and 48. Secondary apertures 46 and 48 may be configured in correspondence with the shapes of scene light admitting primary apertures 42 and 44. As is readily apparent, the secondary apertures 46 and 48 also move in correspondence with the primary apertures 42 and 44 to define a small secondary effective aperture for admitting the passage of light from the scene being photographed to a light detecting station shown generally at 49. The light detecting station 49 includes a light sensitive circuit having both a photocell and control circuit (not specifically shown) which collectively operate to terminate an exposure interval as a function of the amount of light received through the secondary effective aperture as defined by the overlapping photocell sweep apertures 46 and 48. An exposure control mechanism embodying a light detecting station of the above described type is described in more detail and claimed in a U.S. Pat. entitled "Exposure Control System" by V. K. Eloranta No. 3,641,889.

Projecting from the baseblock casting 12 at a location spaced laterally apart from the light entering exposure opening 22 is a pivot pin or stud 50 which pivotally and translatively engages elongate slots 52 and 54 formed in respective shutter blades elements 38 and 40. Pin 50 may be integrally formed with the baseblock casting 12 and blade elements 38 and 40 may be retained in engaging relation with respect to the pin 50 by any suitable means such as peening over the outside end of pin 50.

The opposite ends of the blade elements 38 and 40 respectively include extended portions which pivotally connect to walking beam 56. Beam 56 in turn is disposed for rotation about a laterally extending stud 60 which journals a centrally disposed elongated integral shaft 58 extending from the back side of the walking beam 56. The stud 60 protrudes laterally from an integral extension 62 of the baseblock casting 12. A centrally disposed integral pin 64 extends from the opposing forward side of the walking beam 56 and is in turn disposed for rotation by a bushing 66 in the lens housing casting 14.

In the preferred mode, the walking beam 56 is pivotally connected at its distal ends to the shutter blade elements 38 and 40 by respective pin members 67 and 68 which extend from the walking beam 56. Pin members 67 and 68 are preferably circular in cross-section and extend through respective circular openings 70 and 72 in respective blade elements 38 and 40 so as to slidably engage respective arcuate slots or tracks 74 and 76 which may be integrally formed within the baseblock casting 12. The arcuate tracks 74 and 76 opeate to prohibit disengagement of the blade elements 38 and 40 from their respective pin members 67 and 68 during exposure control system operation.

A tractive electromagnetic device in the form of a solenoid 78 is employed to displace the shutter blades 38 and 40 with respect to each other and the casting 12. A solenoid 78 may be of conventional design carrying an internally disposed cylindrical plunger unit 80 which retracts inwardly into the body of the solenoid upon energization thereof. The solenoid plunger unit 80 is affixed to the walking beam 56 by means of a guideway 82 at the outward end of the plunger 80 which guideway slidably engages a pivot pin 84 extending laterally from an integral radial arm position 86 of the elongated shaft 58. In this manner longitudinal displacement of the plunger unit 80 will operate to rotate the walking beam about the laterally extending stud 60 and bushing 66 so as to approximately displace the shutter blade elements 38 and 40.

The blade elements 38 and 40 are continuously urged into positions defining the largest effective aperture over the light entry exposure opening 22 by a biasing tension spring 88. The movable end of spring 88 engages a slot 90 in a second integral radial arm portion 92 extending outwardly from the elongated shaft 58 while the stationary end of spring 88 is grounded by connection to a pin 93 extending from the baseblock casting 12. With the spring connection herein described, the exposure control mechanism of this invention is biased into a normally opened orientation and the shutter blade elements 38 and 40 are drawn to their closed position only while solenoid 78 is energized. Consequently, energization of the solenoid 78 prevents the shutter blades 38 and 40 from moving toward their maximum aperture opening under the urging of spring 80. However, as should be readily understood, the exposure control mechanism of this invention would be equally applicable to photographic systems where the blades 38 and 40 are spring biased in a normally closed position.

The exposure control system is herein described in relation to a photographic camera of the non-single lens reflex type although the intended scope of the invention is by no means so limited, and cameras of the well known single lens reflex type as described in U.S. Pat. No. 3,672,281 entitled "Reflex Camera" by E. H. Land may be equally suitable for embodying the exposure control system of this invention.

The following photographic cycle of operation is described in regard to a camera of the non-single lens reflex type wherein the viewfinder does not have a through the lens viewing and focusing capability. The ambient photographic cycle is commenced with the depression of a start button (not shown) whereupon tension spring 88 operates to rotate walking beam 56 in a clockwise direction thus moving shutter blade elements 38 and 40 in directions which operate to progressively enlarge the effective aperture over the light entering exposure opening 22. As is readily apparent, rotation of walking beam 56 effects simultaneous translation and rotation of shutter blades elements 38 and 40 about pivot pin 50. Simultaneously photocell sweep secondary apertures 46 and 48 define a corresponding progressively enlarging aperture opening over the photocell. When an appropriate amount of light is received to trigger the light sensitive control circuit, solenoid 78 is again energized to rapidly close blade elements 38 and 40 thereby terminating an exposure interval. The latter energization of solenoid 78 must continue until such a time as a latch 94 is moved into lateral engagement with an integral cam portion 96 of the walking beam 56 in a manner as is more fully described in an application for Ser. No. 554,777 (our case No. 5198) by George Whiteside, Bruce Johnson and David van Allen filed concurrently herewith in common assignment. In the preferred mode, the integral cam portion 96 defines an elongated planar cam surface the edge portion of which is shown at 98 in FIG. 3.

With the ambient operation thus described, relative aperture as well as exposure interval are selectively weighted for any given level of scene brightness so as to optimize the selection of exposure interval and aperture. To trim this ambient performance of the exposure system, an optical trim wedge 100 having selectively variable transmissive properties therethrough, may be pivotally manipulated before the photocell. Adjustment of the position of trim wedge 100 is carried out by manually rotating the trim bezel 18 with respect to a trim mounting plate 102 which is fastened to the lens housing casting 14. The optical trim wedge 100 is disposed for rotation with respect to the trim mounting plate 102 by an interconnecting pivot pin 103. The optical wedge 100 additionally includes an arcuate toothed portion 110 which is drivingly engaged by a peripheral toothed portion 108 around the outside edge of the trim bezel 18, such that manual rotation of the trim bezel in turn operates to rotate the trim wedge 100 about pivot pin 103. Accordingly, manipulation of trim bezel 18 will selectively move the optical trim wedge 100 across the photocell to adjust the amount of light permitted to enter the light sensing control circuit through the photocell sweep secondary apertures 46 and 48. The variable light transmissive properties of the optical trim wedge are provided by a plurality of sections 112, each of which exhibits a different light transmissive property therethrough.

A so called "follow focus" interceptor is provided for operation in conjunction with the focusing components of the camera during the flash mode of operation. As is readily apparent, the backward side of the lens mount assembly 28 drivingly connects to a radial face cam 168 in a manner such that the radial face cam moves is correspondence with manual adjustment of the focus bezel 20. As previously discussed focus bezel 20 is rotatable to provide objective lens focusing and thus the rotational orientation of focusing bezel 20 continuously corresponds with the focus setting of the lens system.

The integral cam portion 96 of walking beam 56 moves through a predetermined arcuate locus of travel as shutter blade elements 38 and 40 are driven either under the biasing spring 88 or from the plunger unit 80 of solenoid 78. For follow focus operation, the movement of walking beam 56 along its locus of travel establishing increasingly widening apertures is selectively arrested to establish a predetermined focus responsive apertural value. Motion arrest is provided by way of an interceptor crank assembly 114 which includes, inter alia, an interceptor pin 134 selectively positionable within the above noted locus of travel so as to contact the cam surface 98 of the integral cam portion 96 to halt the exposure mechanism as it moves under the bias of tension spring 88. Relative positioning of the interceptor crank assembly 114 within the locus of travel of integral cam portion 96 is provided by virtue of a pivotal connection between a crank arm plate 115 and an adjusting bar 118 at pivot point 116.

The interceptor pin 134 is operatively associated with the crank arm plate 115 through an interceptor flapper linkage 120 which includes an elongated center portion 122 disposed for rotation relative to the crank arm plate 115 by a pair of integral pins 124 and 126 extending from the opposed ends of the elongated center portion 122. Pins 124 and 126 are respectively disposed for rotation with respect to the crank arm plate 115 by a pair of spaced apart bearing surfaces shown generally at 128 and 130 which are fastened to the crank arm plate 115. As is readily apparent, the elongated center portion 122 is preferably disposed for rotation about an axis parallel to the plane of shutter blade 38, 40 movement, although the axis may also be slightly skewed with regard to the shutter blade element plane of movement without affecting the operation of the inceptor flapper linkage 120.

Figure 5:
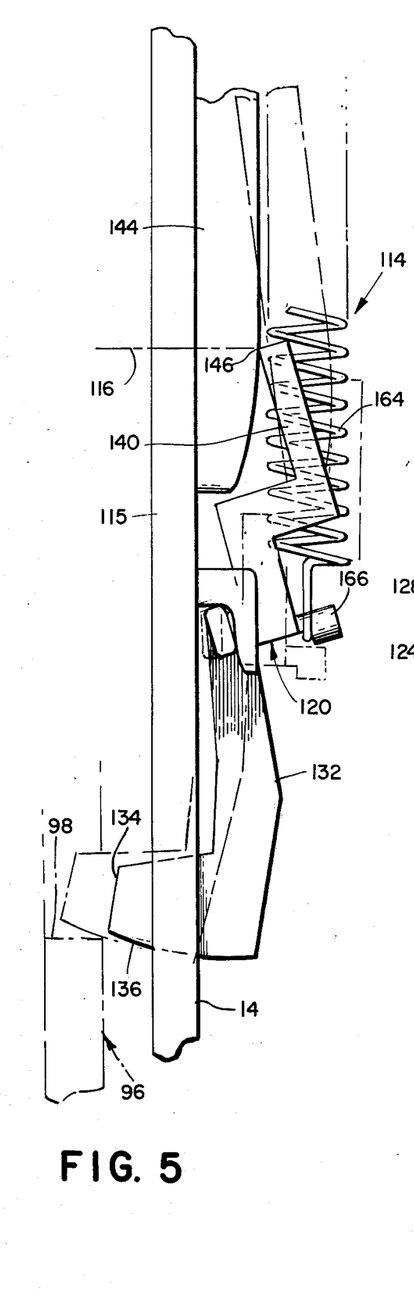
FIG. 5 is an enlarged side view showing a broken away portion of the exposure control system of FIG. 1.
Figure 6:
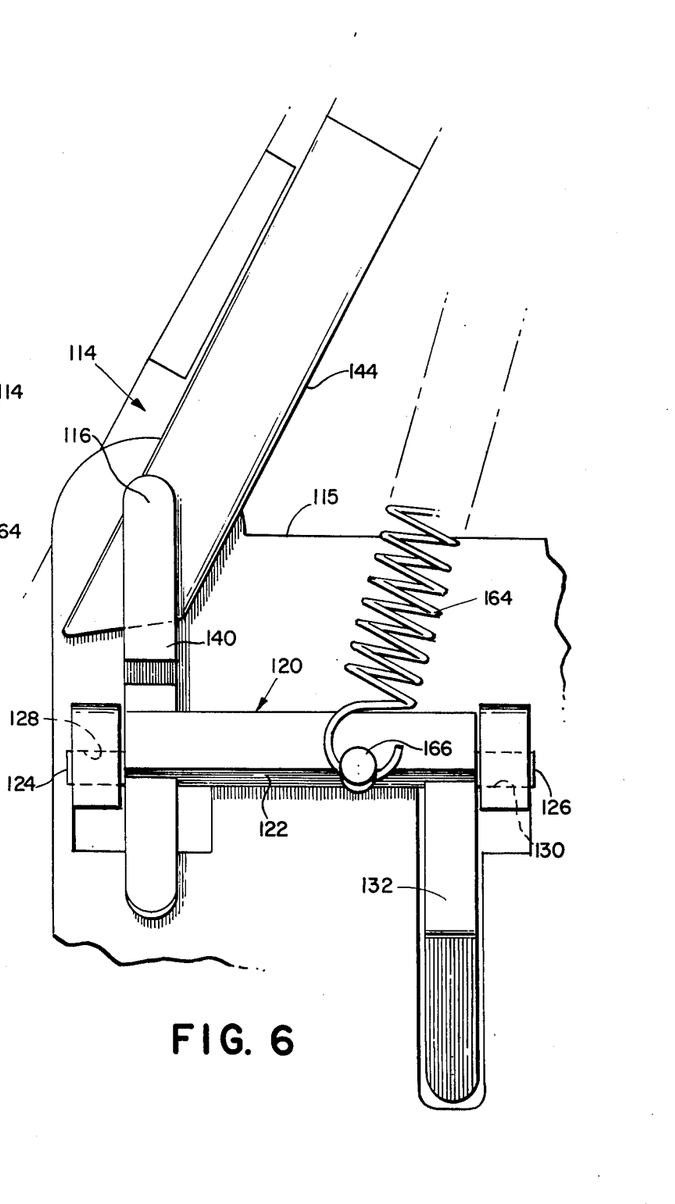
FIG. 6 is an enlarged front view showing a broken away portion of the exposure control system of FIG. 1.
Figures 7, 8, 9:
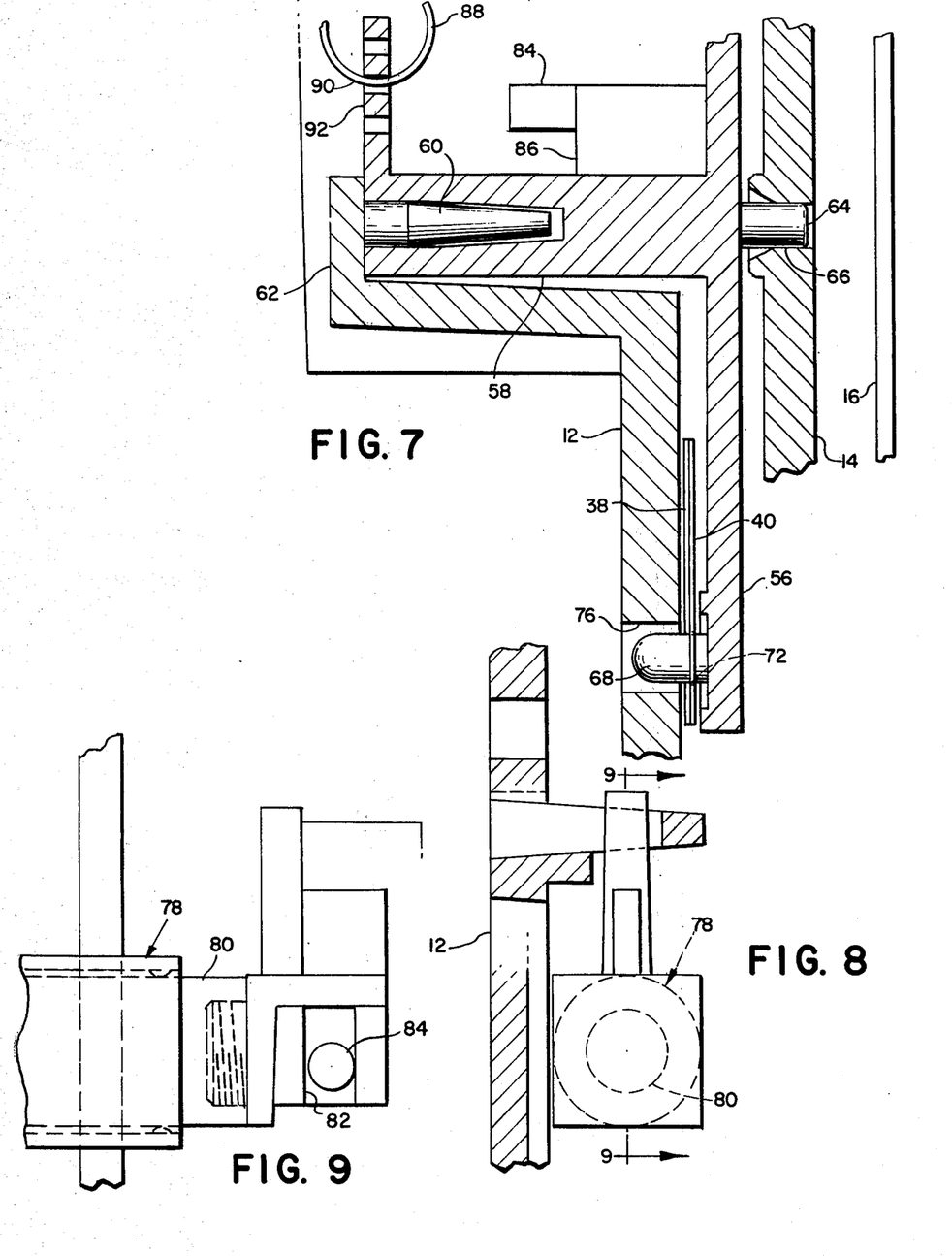
FIG. 7 is a broken away cross-sectional view taken across the lines 7—7 of FIG. 4.
FIG. 8 is a broken away cross-sectional view taken across the lines 8—8 of FIG. 4.
FIG. 9 is a broken away cross-sectional view taken across the lines 9—9 of FIG. 8.

The interceptor flapper linkage 120 additionally includes the integral arm portion 132 extending downwardly from the elongated center portion 122 into fixed connection with the interceptor pin 134, as may be more readily seen by referring to FIG. 5. The interceptor pin 134 includes an arcuate edge surface 136 generated about a center axis coincident with a center axis of rotation for pins 124 and 126 thus making the positioning of interceptor pin 134 within the locus of travel of walking beam 56 insensitive to the exact number of degrees thru which the flapper linkage 120 is rotated as will be subsequently described in greater detail. The interceptor flapper linkage 120 also includes an integral arm portion 140 extending upwardly from the elongated center portion 122 into engaging contact at point 146 with an integral arm position 144 extending downwardly from longitudinal drive link 148 of an actuating assembly shown generally at 142.

The longitudinal drive link 148 is also disposed for rotation relative to the baseblock casting 12 by a pair of spaced apart integral pins 150, 152 extending from the longitudinal drive link 148 in respective journaled relationship with a pair of appropriate bearing surfaces extending from the baseblock 12. As will be readily appreciated, the longitudinal drive link 148 is preferably disposed for rotation about an axis parallel to the plane of shutter blade element 38, 40 movement, although the axis may also be slightly skewed with regard to the shutter blade element plane of movement without affecting the operation of the actuation assembly 142. The actuating assembly 142 additionally includes an integral arm portion 158 extending upwardly from the elongated drive link 148 and defining a tip portion 162 extending into the area of a linear flash array receiving socket 160.

The interceptor crank assembly 114 is biased for rotation in a counterclockwise direction about the pivot point 116 by a tension spring 164, the moving end of which connects to an integral hook portion 166 which extends backwardly from the elongated center portion 122 of the interceptor flapper linkage 120. The non-moving end of the tension spring 164 is grounded with respect to the baseblock casting 12.

Tension spring 164 also simultaneously operates to bias flapper linkage 120 to rotate interceptor pin 134 out of the locus of travel of walking beam 56 while at the same time biasing the flapper arm portion 140 into continuous engagement with the actuating assembly 142 so as to maintain the tip portion 162 thereof within the socket 160.

The lens mount assembly 28 drivingly connects to a radial face cam 168 defining a cam surface 169 concentric with the objective lens 24 optical axis for movement in correspondence with the focus bezel 20. There is additionally included a peripheral flange 171 extending radially outward of the cam surface 169 to provide a light and dust seal.

The radial face cam 168 drivingly engages a rigid adder link 172 at an intergral cam follower portion 176 thereof intermediate the ends of the adder link 172. One distal end of the adder link 172 pivotally connects to the interceptor crank assembly 114 at a pivot point 174. The opposite end of the adder link 172 defines a cam portion 178 disposed for simultaneous translation and rotation about a driver pin 180 which is operatively connected to the trim bezel 18 for movement in correspondence therewith in the following manner. As is now readily apparent, tension spring 164 also serves to bias crank arm plate 115 for counterclockwise rotation about pivot point 116 in this manner facilitating continuous engagement between the follower portion 176 of adder link 172 and the cam 168.

Manual adjustment of trim bezel 18 operates through the meshed teeth 108, 110 to rotate the optical trim wedge 100 about its point of pivotal connection at 103 to the trim mounting plate 102 simultaneously rotating drive pin 180 which is in fixed connection thereto. Thus manual adjustment of the trim bezel 18 operates to simultaneously vary light transmission to the photocell while at the same time rotating drive pin 180 about the trim wedge pivot point at 103. The cam portion 178 may be maintained in continuous driving engagement with pin 180 through an overlying link portion 182 which integrally connects to a second pin 183 extending from the optical trim wedge 100.

Figure 2:
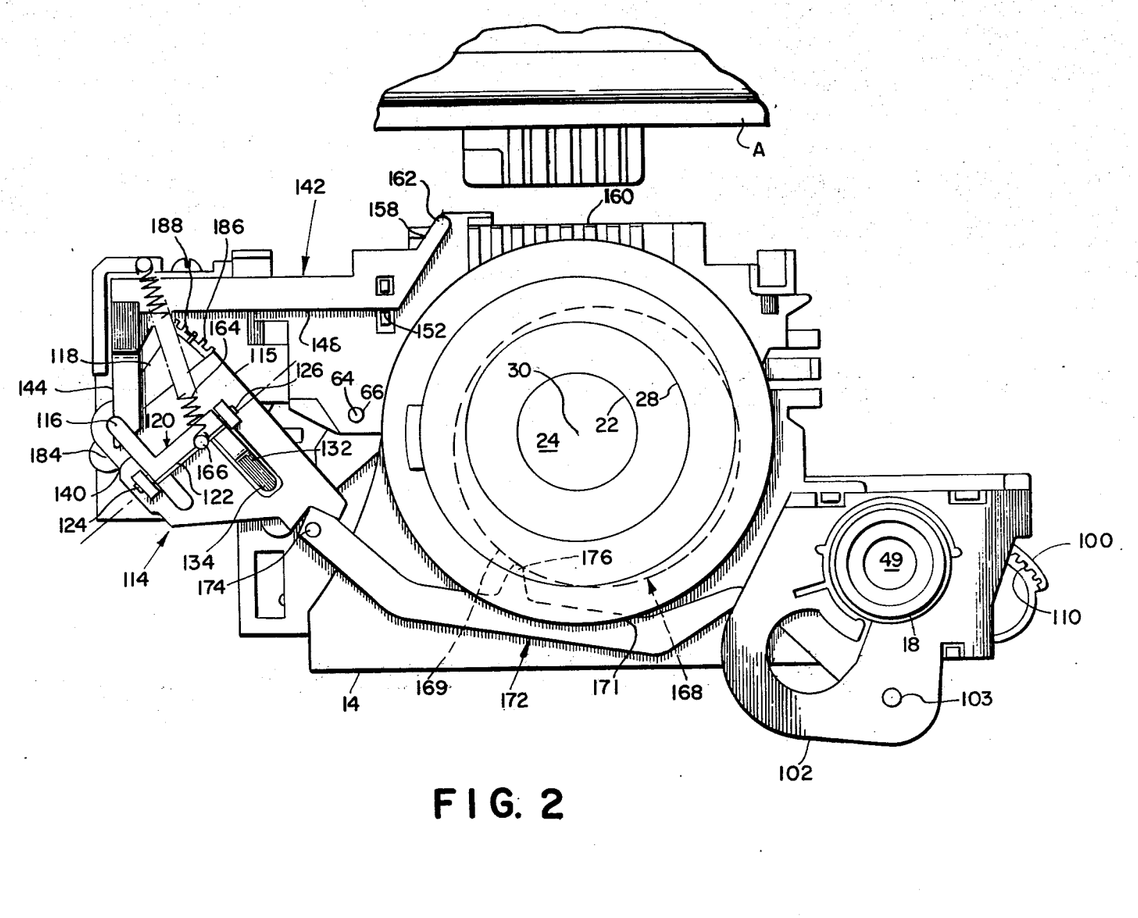
FIG. 2 is a cutaway front view of the exposure control system of FIG. 1.
Figure 3:
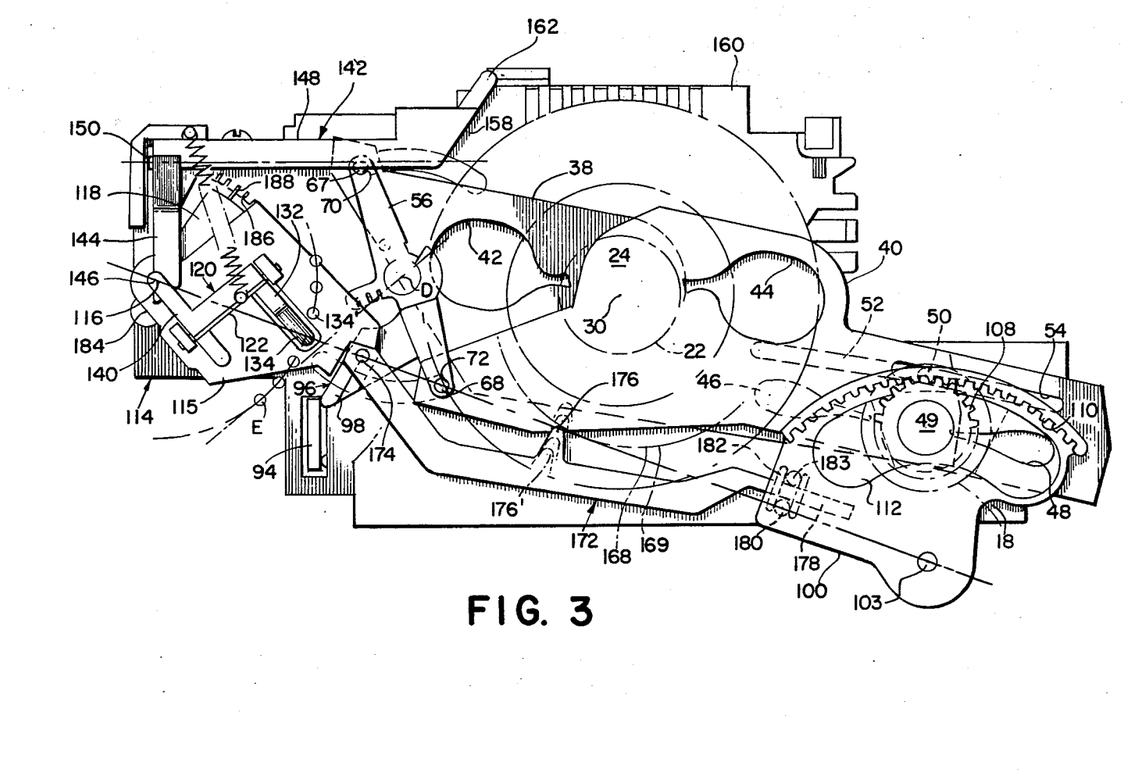
FIG. 3 is a cutaway front view of the exposure control system of FIG. 2.
Figure 4:
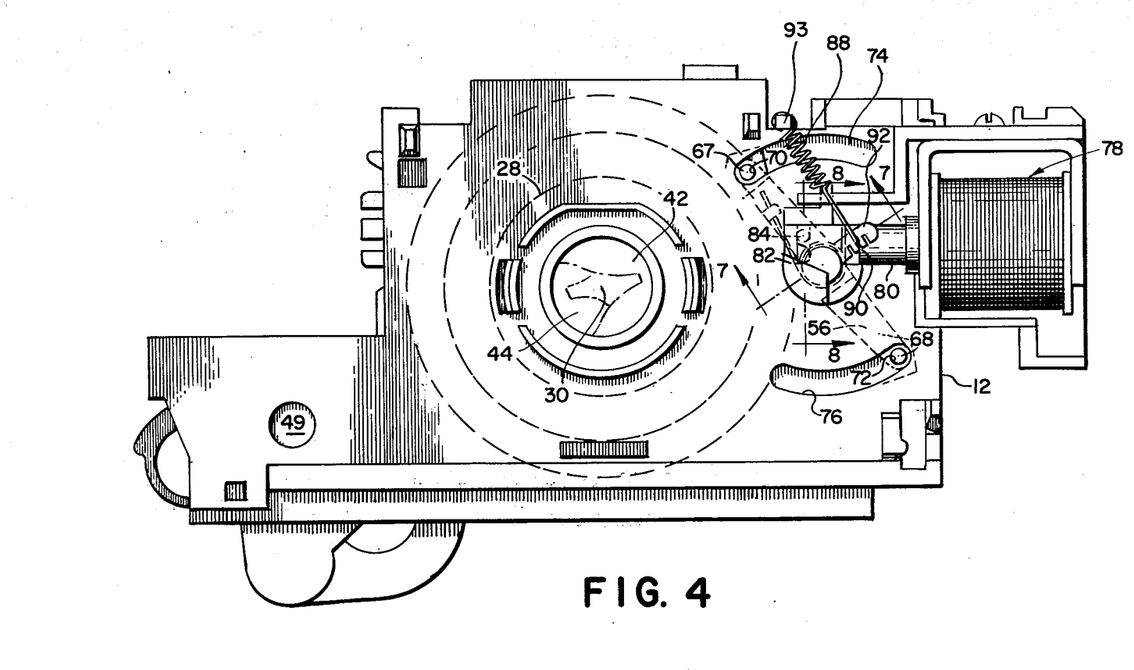
FIG. 4 is a cutaway back view of the exposure control system of FIG. 1.

Actuation of the interceptor flapper linkage 120 during the flash mode of operation is provided as follows. Insertion of the terminal elements operatively connecting to a conventional linear flash array unit A into its associated receiving socket 160 operates to engage the tip portion 162 of the actuating assembly 142 so as to rotate the upwardly extending arm portion 158 thereto about the pivot pins 150, 152 and inwardly from the plane of the drawing as illustrated in FIGS. 2 and 3. Rotation of the upwardly extending arm portion 158 in this manner, in turn, operates to rotate the downwardly extending arm portion 144 outwardly from the plane of the drawing as shown in FIGS. 2 and 3 so as to engage the upwardly extending arm portion 140 of the interceptor flapper linkage 120. The interceptor flapper linkage 120 is thus rotated about the pivot pins 124, 126 against the bias of tension spring 164 such that the interceptor pin 134 and its associated arm portion 132 rotate inwardly from the plane of the drawing as shown in FIGS. 2 and 3 into the locus of travel of the walking beam 56 and its associated integral cam 96. As previously discussed, since the arcuate edge surface 136 of the interceptor pin 134 is generated about the same center axis about which the flapper linkage rotates, the precise point of walking beam interception is therefore determined irrespective of the exact number of degrees through which the interceptor flapper linkage 120 rotates upon insertion of a linear flash array. As is now apparent, it is not necessary that the tip portion 162 of the actuating assembly 142 be always rotated through a precise number of degrees in order to locate the interceptor pin at a precise point of interception. Thus each linear flash array unit need not be exactly dimensioned in order to precisely locate the interceptor pin 134.

It will also be readily appreciated that the locus of travel defined by movement of the point of engagement at 146 between the arm positions 140, 144 lies on a plane which intersects the crank arm plate pivot point 116. As a result of this alignment, movement of the actuating assembly 142 in response to insertion of a linear flash array unit into its associated receiving socket 160 is imparted solely to the flapper linkage 120 without torquing the crank arm plate 115 about its pivot point 116.

During the flash mode of operation the interceptor crank assembly 114 is actuated in the aforementioned manner to move the interceptor pin 134 into the locus of travel of the walking beam 56 and its associated integral cam 96. Once actuated the interceptor pin 134 is thereafter in position to intercept the cam surface 98 of the walking beam 56 during an exposure interval, which point of interception coincides with a precise aperture value as is determined by the cooperative relation of the aperture blade elements 38 and 40 together with their associated light admiting primary apertures 42 and 44. In this manner the camera may be adjusted in accordance with the levels of artificial illumination anticipated at the scene to be photographed.

Thus the mechanical and geometric relationship between the radial face cam 168, trim link 172, interceptor crank assembly 114, and interceptor pin 134 are based upon an application and evaluation of the inverse square law of light energy propagation where the light energy available from a given source is considered to vary inversely with the square of the distance from that source. An analog representation of the light source to subject distance is provided by the radial face cam 168 which moves in correspondence with the focusing bezel 20 to drive the trim link 172 about the fixed pin 180 so as to in turn rotate the interceptor crank assembly 114 about the fixed pivot point 116. As is readily apparent, the interceptor pin 134 is also rotated in concert with the interceptor crank assembly 114 so as to vary its location along the walking beam 56 and integral cam 96 locus of travel in accordance with the inverse square law of light energy propagation. In other words, the maximum aperture to which the aperture blade elements 38, 40 may open is directly determined by the focusing system of the camera in conformance with the inverse square law of light energy propagation.

In the orientation corresponding to an F/8 stop, interceptor pin 134 is positioned to establish a fully open aperture. Other positions of interceptor pin 134 serving to arrest walking beam cam 98 to establish progressively diminishing apertures up to about F/60 are shown at 134' together with the positions at which the walking beam cam 96 is intercepted for the diminishing aperture sizes. The locus of travel of interceptor pin 134 as illustrated by the series of circles at 134' describes an arcuate segment of a circle the center of which coincides with the center of rotation of the interceptor crank assembly 114 at pivot point 116. Relative positions of follower portion 176 of link 172 for various adjustments of focus bezel 18 are shown at 176'. These serially disposed positions of integral cam follower 176 follow the same F-number sequence in correspondence with the interceptor pin 134 as well as walking beam cam 96. The radial face cam 168 may also be configured to provide a dwell portion during which a continuous maximum aperture is established. This portion of the focusing range represents subject distances from infinity to the effective output range of the source of artificial illumination being used. As this effective range is reached, the cam 168 is configured to commence simultaneous translation and rotation of adder link 172 about pivot point 180 in a manner causing interceptor pin 134 to rotate about its respective pivot point at 116 so as to define progressively increasing numerical values of aperture.

The trim bezel 18 may also be manually rotated to provide trim adjustment in the following manner. Manual rotation of the trim bezel 18 is imparted to the optical trim wedge 100 by way of the meshed teeth 108, 110. Rotation of the trim wedge 100, in turn, operates to rotate its associated drive pin 180 about the point of pivotal connection at 103 between the trim wedge 100 and mounting plate 102. The rotation of drive pin 180 in turn operates to rotate the adder link 172 about its follower portion 176 so to pivot the interceptor crank assembly 114 about its associated point of pivot at 116.

In this manner, the interceptor pin 134 may be rotated through its arcuate path in concert with rotation of the trim bezel 18. Accordingly, manual rotation of trim bezel 18 causes the position of interceptor pin 134 to be selectively advanced or retarded in its aperture defining position therewithin and the interceptor assembly 114 can thus be adjusted or trimmed by any select exposure value through a simple manipulation of the trim bezel 18. The trim bezel 18 may be adjusted through either a clockwise or counterclockwise rotation thereof from an intermediate neutral position as shown in FIG. 3. As is readily apparent from FIG. 3 full counterclockwise rotation of the trim wedge 100 operates to permit the adder link 172 to be rotated by the biasing spring 164 in a clockwise direction about the follower portion 176, thus rotating the interceptor crank assembly 114 and its associated interceptor pin 134 in a counterclockwise direction about the pivot point 116 to define a progressively increasing aperture area. Conversely, clockwise rotation of trim wedge 100 about its associated pivot point 103 operates to rotate adder link 172 about its follower portion 176 and against the bias of spring 164 in turn rotating interceptor crank assembly 114 and its associated interceptor pin 134 in a clockwise direction about pivot point 116 to define progressively decreasing aperture areas.

As is now readily apparent, an important feature of this adjustment is that a full clockwise or counterclockwise rotation of the trim bezel 18 from its neutral position will always operate to impart a substantially corresponding change in the degrees of rotation of the interceptor pin 134 about the pivot point 116 regardless of the position of focus bezel 18 and its associated radial face cam 168. A predetermined number of degrees rotation of the interceptor pin 134 will in turn correspond to a predetermined number of F/stop changes in the aperture value defined by the scene light admitting primary apertures 42 and 44 regardless of the initial position of the interceptor pin 134. Therefore, the trim adjustment remains substantially uniform regardless of focus and cam 168 adjustment. In other words, rotation of the trim bezel 18 about a preselected number of degrees in either direction from the neutral position will be reflected by a predetermined number of degrees rotation of the interceptor pin 134 about the pivot point 116 thus changing the aperture value by a predetermined number of F/stops regardless of the position of the radial face cam 168 in its associated focus bezel 18. In a preferred mode of operation it is desirable that a full adjustment of the trim bezel 18 from the neutral position correspond to a one and one half F/stop change in the aperture value.

The above described linear correspondence between the trim adjustment and its associated change in aperture value is made possible by the mechanical and geometric interrelationship of the exposure system components fully discussed in an application for U.S. Patent entitled "Exposure Control System With Follow Focus Capability" by G. Whiteside, Ser. No. 554,926 (our case No. 5300) filed concurrently herewith and assigned in common herewith.

Thus, there has been shown an exposure control mechanism for use with a photographic camera apparatus of the type having means for initiating the energization of a source of artificial illumination such as the above described linear flash array unit. The exposure control mechanism is automatically activated in a simple and reliable manner during the flash mode of operation by insertion of a flash array unit A within the receiving socket 160. The activating assembly 142 operates in concert with the interceptor flapper linkage 120 to automatically move the interceptor pin 134 into the locus of travel of the walking beam 56 and its associated integral cam 96. The arcuate edge surface 136 of the interceptor pin 134 guarantees that the precise point of walking beam interception will not be dependent upon the exact number of degrees through which the interceptor flapper linkage 120 rotates.

Thus the linear flash array units need not be critically dimensioned in order to insure that the interceptor pin 134 always be rotated outward to the identical position upon insertion of a new flash array unit. In fact the exact rotation of the interceptor pin 134 may vary for different flash array units, however the exact point of interception with the walking beam integral cam 96 will always remain identical due to the arcuate nature of the edge surface 136.

A single tension spring 164, due to its strategic location, simultaneously performs a plurality of functions by first biasing the flapper linkage 120 to rotate the interceptor pin 134 out of the locus of travel of walking beam 56 while at the same time biasing the flapper arm portion 140 into continuous engagement with the actuating assembly 142 to maintain the tip portion 162 thereof within the socket 160. Tension spring 164 also simultaneously biases the crank arm plate 115 for counterclockwise rotation about pivot point 116 in order to maintain continuous engagement between the follower portion 176 of adder link 172 and the radial face cam 168.

It will be further appreciated that the point of engagement at 146 between the arm portions 170, 144 when actuated to move thru its locus of travel defines a plane intersecting the crank arm plate pivot point 116. This alignment insures that movement of the actuating assembly 147 in response to insertion of a linear flash array unit into its associated receiving socket 160 operates only to move the flapper linkage 120 without tending to rotate the crank arm plate 115 about its pivot point 116, which rotation would upset the precise position of interception as defined by the interceptor pin edge surface 136.

Since certain changes may be made in the above described system and apparatus without departing from the scope of the invention herein involved, it is intended that all matter contained in the description thereof or shown in the accompanying drawings shall be interpreted as illustrative and not in a limiting sense.

We claim:

1. Apparatus for a camera including a housing and an objective lens mounted on said housing and defining a film plane, said apparatus comprising:
   a socket mountable on the housing and configured to receive at least one terminal element connecting to a source of artificial light;
   a blade assembly movable along a predetermined path between a first position wherein it precludes scene light from reaching the film plane and a second position wherein it defines a maximum size aperture, said blade assembly serving to define a range of progressively increasing sized apertures as it moves from its said first position to its said second position;

an actuator mounted for displacement with respect to said socket wherein a portion of said actuator is normally disposed adjacent said socket to automatically be engaged and displaced by the terminal element of the artificial light source as it is inserted into said socket;

an interceptor; and means for connecting said interceptor to said actuator, said connecting means being configured and arranged to position said interceptor in spaced apart relation relative to the plane of said predetermined path so as not to interfere with the movement of said blade between its said first and second positions prior to the insertion of the terminal element of the source of artificial light into said socket and to cause said interceptor to be displaced transversely, responsive to said actuator being displaced when the terminal element of the source of artificial light is inserted into said socket, into said predetermined path so that it will be operative to restrain the movement of said blade assembly as said blade assembly moves from its said first position towards its said second position, said interceptor thus serving to establish the largest aperture to be defined by said blade assembly at such times.

2. The apparatus of claim 1 additionally including:

means for adjusting the objective lens to accommodate its focusing at the camera's film plane images of scenes located at different distances from the camera; and means responsive to the operation of said adjusting means for acting upon said connecting means to adjust the position of said interceptor along said predetermined path.

3. The apparatus of claim 1 including unitary biasing means for simultaneously biasing said connecting means and said interceptor so as to urge said interceptor out of said predetermined path while at the same time biasing said actuator so that said portion of said actuator remains normally disposed adjacent said socket for engagement with the terminal element of the artificial light source upon insertion of the terminal element of the artificial light source into said socket.

4. The apparatus of claim 2 wherein said actuator portion defines at least one pivotal arm portion extending into said socket means in a manner whereby insertion of the terminal element of the source of artificial light within said socket operates to engage said actuator pivotal arm portion so as to pivotally move said actuator arm portion in a direction substantially transverse to the direction of terminal element insertion into said socket thus causing said displacement of said actuator in correspondence with the receipt of the terminal element of the source of artificial light within said socket.

5. The apparatus of claim 2 wherein said connecting means is rotatably disposed with respect to an axis substantially parallel to said predetermined path and said interceptor defines an arcuate edge portion, the center axis of which coincides with the center axis about which said connecting means rotates in order that said blade assembly movement along said predetermined path be arrested at a select aperture value regardless of the precise number of degrees thru which the interceptor edge portion and its associated connecting means are rotated by said actuator displacement in response to the terminal element of the artificial light source being received by said socket.

6. Apparatus for a camera including a housing and an objective lens mounted on said housing and defining a film plane, said apparatus comprising:

a socket mountable on the housing configured to receive at least one terminal element connecting to a source of artificial light;

a blade assembly movable along a predetermined substantially planar path between a first position wherein it precludes scene light from reaching the film plane and a second position wherein it defines a maximum size aperture, said blade assembly serving to define a range of progressively increasing sized apertures as it moves from its said first position to its said second position;

an actuator mounted for displacement about an axis substantially parallel to said predetermined path, a portion of said actuator being normally disposed adjacent said socket to automatically be engaged and displaced by the terminal element of the artificial light source as it is inserted into said socket causing said actuator to rotate about its said axis;

an interceptor; and means for connecting said interceptor to said actuator, said connecting means being configured and arranged to position said interceptor along said predetermined path in spaced relation thereto so as not to interfere with the movement of said blade between its said first and second positions prior to the insertion of the terminal element of the source of artificial light into said socket and to cause said interceptor to be displaced, responsive to said actuator's being rotated about its axis when the terminal element of the source of artificial light is inserted into said socket, into said predetermined path so that it will be operative to restrain the movement of said blade assembly as said blade assembly moves from its said first position towards its said second position, said interceptor thus serving to establish the largest aperture to be defined by said blade assembly at such times.

7. The apparatus of claim 6 additionally including:

means for adjusting the objective lens to accomodate its focusing at the camera's film plane images of scenes located at different distances from the camera; and means responsive to the operation of said adjusting means for acting upon said connecting means to adjust the position of said interceptor along said predetermined path.

8. The apparatus of claim 7 including unitary biasing means for simultaneously biasing said connecting means and said interceptor so as to urge said interceptor out of said predetermined path while at the same time biasing said actuator so that said portion of said actuator remains normally disposed adjacent said socket for engagement with the terminal element of the source of artificial light upon insertion of the terminal element of the source of artificial light into said socket.

9. The apparatus of claim 7 wherein said actuator portion defines at least one pivotal arm portion extending into said socket in a manner whereby insertion of the terminal element of the source of artificial light within said socket operates to engage said actuator pivotal arm portion so as to pivotally move said actuator arm portion in a direction substantially transverse to the direction of terminal element insertion into said socket thus causing said displacement of said actuator in correspondence with the receipt of the terminal element of the source of artificial light within said socket.

10. The apparatus of claim 7 wherein said connecting means is rotatably disposed with respect to a second axis substantially parallel to said predetermined path in order that said interceptor be transversely displaced into said predetermined path by said connecting means and said interceptor defines an arcuate edge portion, the center axis of which coincides with the center axis about which said connecting means rotates in order that said blade assembly movement along said predetermined path be arrested at a select aperture value regardless of the precise number of degrees thru which the interceptor edge portion and its associated connecting means are rotated by said actuator displacement in response to the terminal element of the artificial light source being received by said socket.

11. An exposure control mechanism for photographic apparatus of the type having means for initiating the energization of a source of artificial light from an energy source in order to illuminate a photographic scene together with means for defining an optical path including an optical objective to image said scene at an image plane comprising:
exposure means movable along a locus of travel to define a range of apertures over said optical path;
socket means for receiving at least one terminal element connecting the source of artificial light;
actuating means movable in correspondence with the receipt of the terminal element of the source of artificial light within said socket means; and
means for arresting movement of said exposure means including flapper means in rotatable connection with respect to a select axis defined by said arresting means, said flapper means carrying an interceptor edge portion which is transversely rotated into said exposure means locus of travel by said actuating means for arresting movement of said exposure means along said locus of travel to define a select aperture value over said optical path in response to the terminal element of the source of artificial light being received by said socket means.

12. The exposure control mechanism of claim 11 wherein said flapper means is rotatably disposed with respect to said arresting means about an axis spaced apart from said exposure means locus of travel and said interceptor edge portion defines an arcuate portion, the center axis of which coincides with the center axis about which said flapper means rotates in order that said exposure means movement along said locus of travel be arrested at said select aperture value regardless of the precise number of degrees thru which the interceptor edge portion and its associated flapper means are rotated by said actuating means in response to the terminal element of the source of artificial light being received by said socket means.

13. The exposure control mechanism of claim 11 wherein said flapper means includes: an elongated center portion disposed for rotation with respect to said arresting means about an axis spaced apart from said exposure element locus of travel, a first arm portion extending outwardly from said elongated center portion, an interceptor pin extending outwardly from said first arm portion in a manner defining said interceptor edge portion at a location spaced apart from said flapper means axis of rotation, and a second arm portion extending outwardly from said elongated center portion at a location spaced apart from said first arm portion so as to engage said actuating means in a manner whereby receipt of the terminal element of the source of artificial light within said socket means operates to move said actuating means which in turn engages and rotates said second arm portion about said flapper means axis of rotation thereby rotating said elongated center portion together with said first arm portion and said interceptor pin so as to laterally move said interceptor pin into arresting position along said locus of travel.

14. The exposure control mechanism of claim 13 wherein said interceptor edge portion defines an arcuate portion generated about a center axis coincident with the center axis about which said flapper means rotates in order that the position at which said exposure means movement is arrested along said locus of travel be independent of the precise number of degrees thru which the interceptor edge is rotated by said actuating means.

15. The exposure control mechanism of claim 13 wherein said actuating means includes an elongated drive link disposed for rotation about an axis spaced apart from said axis of flapper means rotation and including a third arm portion extending outwardly therefrom into engaging contact with the second arm portion of said flapper means, together with a fourth arm portion extending outwardly from the drive link at a location spaced apart from said third arm portion, the outward tip of said fourth arm portion extending into said socket means such that receipt of the terminal element of the source of artificial light within said socket operates to rotate said fourth arm portion about said axis of drive link rotation, in turn rotating the drive link and its associated third arm portion into driving engagement with the second arm portion of said flapper means.

16. The exposure control mechanism of claim 15 including unitary biasing means for simultaneously biasing said flapper means and its associated interceptor edge portion out of said exposure element locus of travel in a manner whereby said second arm portion of said flapper means biasingly engages said third arm portion of said actuating means so as to urge the fourth arm portion thereof into said socket means for engagement with the terminal element of the source of artificial light upon insertion of the terminal element of the source of artificial light into said socket means.

17. The exposure control mechanism of claim 16 wherein said interceptor edge portion defines an arcuate portion generated about a center axis coincident with the center axis about which said flapper means rotates in order that the position at which said exposure means movement is arrested along said locus of travel be independent of the precise number of degrees thru which the interceptor edge is rotated by said actuating means.

18. An exposure control mechanism for photographic apparatus of the type having means for initiating the energization of a source of artificial light from an energy source in order to illuminate a photographic scene together with means defining an optical path including an optical objective adjustable to image the photographic scene at an image plane, comprising:

focusing means movable to adjust the optical objective;

exposure means having at least one element movable along a locus of travel and defining a range of apertures over said optical path in correspondence with said element movement, socket means for receiving at least one terminal element connecting the source of artificial light;

actuating means movable in correspondence with the receipt of the terminal element of the source of artificial light within said socket means;

first means rotatable about a first pivot point in spaced relation with respect to said exposure element locus of travel for arresting movement of said exposure means and including flapper means in rotatable connection with respect to a select axis defined by said first means, said flapper means carrying an interceptor edge portion which is transversely rotated into said exposure element locus of travel by said actuating means for arresting movement of said exposure element along said locus of travel to define a select aperture value over said optical path in response to the terminal element of the source of artificial light being received by said socket means; and second means for rotating said first means about said first pivot point in correspondence with said focusing means movement in order to locate said interceptor edge at a select position establishing said select aperture corresponding with the distance from the optical objective to the photographic scene.

19. The exposure control mechanism of claim 18 wherein said flapper means is rotatably disposed with respect to said first means about an axis orthogonal to the axis of said first pivot point, said axis of flapper means rotation additionally being spaced apart from said exposure element locus of travel wherein said interceptor edge defines an arcuate portion, the center axis of which coincides with the center axis about which said flapper means rotates in order that said exposure element movement along said locus of travel can be arrested at said select aperture value regardless of the precise number of degrees thru which the interceptor edge and its associated flapper means are rotated by said actuating means in response to the terminal element of the source of artificial light being received by said socket means.

20. The exposure control mechanism of claim 18 wherein said flapper means includes: an elongated center portion disposed for rotation with respect to said first means about an axis orthogonal to the axis of said first pivot point, said axis of flapper means rotation additionally being spaced apart from said exposure element locus of travel; a first arm portion extending outwardly from said elongated center portion, an interceptor pin extending outwardly from said first arm portion in a manner defining said interceptor edge portion at a location spaced apart from said flapper means axis of rotation, and a second arm portion extending outwardly from said elongated center portion at a location spaced apart from said first arm portion so as to engage said actuating means in a manner whereby receipt of the terminal element of the source of artificial light within said socket operates to move said actuating means which in turn engages and rotates said second arm portion about said flapper means axis of rotation thereby rotating said elongated center portion together with said first arm portion and said interceptor pin into arresting position along said locus of travel.

21. The exposure control mechanism of claim 20 wherein said interceptor edge portion defines an arcuate portion generated about a center axis coincident with the center axis about which said flapper means rotates in order that the position at which said exposure element movement is arrested along said locus of travel be independent of the precise number of degrees thru which the interceptor edge is rotated by said actuating means.

22. The exposure control mechanism of claim 20 including unitary biasing means for simultaneously biasing said flapper means and its associated interceptor edge portion out of said exposure element locus of travel while at the same time biasing said interceptor means for rotation about said first pivot point in a direction which facilitates second means movement in correspondence with said focusing means.

23. The exposure control mechanism of claim 20 wherein said actuating means includes an elongated drive link disposed for rotation about an axis spaced apart from said axis of flapper means rotation and including a third arm portion extending outwardly therefrom into engaging contact with the second arm portion of said flapper means, together with a fourth arm portion extending outwardly from the drive link at a location spaced apart from said third arm portion, the outward tip of said fourth arm portion extending into said socket means such that receipt of the terminal element of the source of artificial light within said socket means operates to rotate said fourth arm portion about said axis of drive link rotation, in turn rotating the drive link and its associated third arm portion into driving engagement with the second arm portion of said flapper means.

24. The exposure control mechanism of claim 23 including unitary biasing means for simultaneously biasing said flapper means and its associated interceptor edge portion out of said exposure element locus of travel in a manner whereby said second arm portion of said flapper means biasingly engages said third arm portion of said actuating means so as to urge the fourth arm portion thereof into said socket means for engagement with the terminal element of the source of artificial light upon insertion of the terminal element of the source of artificial light into said socket means; said unitary biasing means additionally biasing said interceptor means for rotation about said first pivot point in a direction which facilitates follower means movement in correspondence with said focusing means.

25. The exposure control mechanism of claim 23 wherein said interceptor edge portion defines an arcuate portion generated about a center axis coincident with the center axis about which said flapper means rotates in order that the position at which said exposure means movement is arrested along said locus of travel be independent of the precise number of degrees thru which the interceptor edge is rotated by said actuating means.

26. The exposure control mechanism of claim 23 wherein the plane defined by the locus of travel of the point of engagement between the third arm portion of said actuating means and the second arm portion of said flapper means intersects said first pivot point of first means rotation such that the movement of said actuating means resulting from insertion of the terminal element of the source of artificial illumination within said socket means is imparted solely to the flapper means without torquing the first means about the first pivot point.

27. The exposure control mechanism of claim 18 wherein said actuating means contacts said flapper means at a point movable thru a locus of travel which lies on a plane intersecting the first pivot point about which the first means rotates such that movement of said actuating means resulting from insertion of the terminal element of the source of artificial illumination within said socket means is imparted solely to the flapper means without torquing the first means about the first pivot point.

* * * * *